Patented Apr. 11, 1939

2,154,400

UNITED STATES PATENT OFFICE 2,154,400

STABLE CASEIN SOLUTION

Carl Iddings, Staten Island, N. Y., assignor to The Muralo Company, Inc., a corporation of New York No Drawing. Application December 8, 1933, Serial No. 701,573

21 Claims. (Cl. 134—12)

This invention relates to stable casein solutions and their production, to be used for the manufacture of water paste paints, water-oil emulsions, glues, sizes and the like. These solutions are also intended for the preparation of coating compositions adapted to be applied to walls, floors, leather, paper, etc., and they may further serve as a basis for printing inks.

One object of the present invention is the production of a casein solution which maintains substantially its initial viscosity or which does not substantially diminish in viscosity and which also displayes a tendency to putrefy is thus characterized by high stability over long periods of time.

Another object of the present invention is the production of a casein solution or suspension which remains stable regardless of whether it is subsequently rendered slightly acidic or slightly alkaline.

A third object of the present invention is the manufacture of a casein solution or suspension which possesses a heavy body and yet will retain its flowing properties.

It is well established from the prior art that slightly basic stable casein solutions have never been achieved by dissolving ordinary casein in alkalis. I am well aware however that casein solutions have been produced in the past by peptizing casein with fluorides as exemplified by United States Patent No. 1,506,608 to Regnier and United States Patent No. 1,893,608 to Atwood. All of these prior disclosures however, fail to disclose methods of preparing casein solutions which will remain stable for long periods of time, or which may be rendered alkaline and retain their stability. Solutions heretofore produced are further objectionable because of their rather thin body in proportion to casein content as compared with my solutions.

According to my invention, casein is peptized and/or dissolved at elevated temperatures in the presence of small amounts of sodium fluoride or other compounds of alkaline nature or compounds that possess a distinct peptizing or dispersing action on the casein, and a predetermined amount of water. If too much water is used, the casein has a tendency to swell to a curdy gelatinous mass but it fails to dissolve into a smooth, creamy and translucent composition which is required for the aforementioned purposes. On the other hand, if too small an amount of water is employed, the casein becomes too stiff for proper stirring, and consequently the mass adheres to the walls of the container during the initial heating stages which causes uneven heating and objectionable darkening in color of the casein. When casein is dissolved in accordance with my invention, it does not appear to swell through a curdy stage, but seems to pass direct from a coarsely granular and sticky condition to a smooth, viscous solution in which the casein particles seem to be well peptized or dissolved. The viscous casein solution obtained in this manner, may be somewhat diluted or rendered alkaline without losing its valuable properties. It is possible to produce with my process, stable casein solutions having pH values of 5.7–10.5. I have found, for example, that rendering such solutions alkaline to a pH value of about 9 has in no way impaired their stability or keeping qualities.

I have found by experimentation that sodium fluoride has the property of peptizing casein, partially neutralizing the same, and of rendering the resulting solution resistant to hydrolysis and attack by micro-organisms. I have found many other substances which possess the property of peptizing casein, and find that they are quite satisfactory for the preparation of various solutions, it being necessary in such cases only to add a suitable preservative, such as chlorphenol, to render the solution resistant to attack by micro-organisms. I prefer to use sodium fluoride for my purposes because it combines both of these desirable functions.

I prefer to use sodium fluoride in amounts varying from 14 to 20 parts per 100 parts of commercial, acid-precipitated casein, although satisfactory results may be obtained by slightly varying these proportions, and I have found that no additional compounds are required to produce satisfactory casein solutions. According to my experiments, a temperature of 160° F. is too low to produce a smooth appearing solution which will retain its stability for long periods of time, and for this reason I prefer in accordance with my discovery to use higher temperatures, namely between 170 and 210° F. Temperatures between 180 and 195° F. have been found to be the optimum for producing my stable casein solutions and in some cases a minimum of 180° F. is necessary. As far as the addition of water is concerned, I have discovered that it is undesirable to use less than 125 parts of water per 100 parts of casein during the initial heating period. Larger amounts of water, for example, 450 parts or more may be used, and have been found to yield smooth, stable solutions. Solutions prepared with this quantity of water, however, have slightly thinner body and slightly lower pH values than those prepared with lesser quantities of water. In order to achieve a more nearly neutral solution of good body, I ordinarily prefer to use quantities of water less than 450 parts, to 100 parts of casein. My best results have been obtained by using initially from 125–350 parts of water per 100 parts of casein, and 250 parts of water has given highly satisfactory results. If a casein solution with a high water content is desired, I prefer to prepare a solution with part of the water, and subsequently to dilute the initial solution to the proper consistency.

I have found that any acid-precipitated casein will work satisfactorily in my process, provided that during its manufacture it was washed and pressed reasonably free from excess acids used in its manufacture. Pure casein in contact with water possesses a pH value of about 4.6, whereas casein possessing excess acid may possess a pH value as low as 4.3. Casein precipitated with hydrochloric acid, due to the volatility of this acid, is relatively free from excessive acid and dissolves very easily when treated according to my process. However, my invention is not limited to such hydrochloric acid-precipitated casein since the excessive acid of other caseins may be compensated by using a larger amount of sodium fluoride. For purposes of economy however, I prefer to add to such caseins, very small quantities of an alkaline compound, for example borax, sodium silicates, trisodium phosphate, sodium carbonate, ammonium carbonate, ammonium hydroxide, etc., that is to say, such alkaline compounds which do not produce insoluble caseinates, to take care of their excessive acids, and the amount of such alkali used is slightly in excess of that amount required for neutralization of the excessive acids but insufficient to effect the solution of the casein by itself. By regulating the excessive acid of casein products prior to the fluoride treatment, satisfactory solutions may be obtained from any type of commercial, acid-precipitated caseins.

My process, however, in its broader aspects, is not limited to the use of fluorides, such as sodium or potassium fluoride, since they may be replaced by other substances, such as piperazine, acetamid, ammonium thiocyanate or sodium silicates. When solutions are prepared with these materials, it is advisable to incorporate a small amount of preservative, such as chlorphenol, to render the solution resistant to attack by micro-organisms. I have also found that the quantities of these peptizing or dispersing agents required may be greater than the quantity of sodium fluoride required to peptize the same amount of casein. Hence, for most purposes, sodium fluoride is more economical. For this reason I prefer ordinarily to use sodium fluoride, since it combines both a dissolving and preserving action, but I wish to make it clearly understood that this invention is not limited to the use of fluorides only.

I have stated above that the solution prepared according to my process may be rendered alkaline. I have used a large variety of alkalis for this purpose satisfactorily and mention some of them here by way of example. I may take the casein solution which has been prepared in the manner disclosed herewith, for example, and add such amounts of any of the following, or mixtures thereof, as will bring this solution to the desired pH value: sodium silicates, diethylamine, ethylamine, ammonium hydroxide, ethanolamine, diethanolamine, triethanolamine, ethylene diamine, piperadine, piperazine, borax, trisodium phosphate, sodium carbonate, ammonium carbonate, caustic soda.

A typical example of my process is the following:

To 100 parts of hydrochloric acid-precipitated casein are added 15 parts of commercial sodium fluoride and 200 parts of water and the whole stirred quickly to a thin uniform grainy mass. The casein quickly soaks up the liquid present and presents the appearance of a damp, granular meal, any lumps present being readily friable. After attaining this condition within a few minutes, and after standing long enough for the casein granules to become thoroughly soaked, the mass is carefully heated to 170–210° F., preferably to 195° F., under stirring, and maintained at approximately this temperature for from a few minutes to several hours, until it forms a smooth stiff pasty solution. The time of treatment chosen depends upon the type of product desired; the longer the period of treatment the more viscous are the resulting products. When using ordinary commercial acid-precipitated casein, I prefer to heat the mixture at this stage for from ½ hour to 1 hour. During the heating, the casein appears to melt into the viscous condition referred to and loses all of its grainy characteristics. The resulting solution may be diluted, preferably while still warm. As an example of such dilution, 250 parts of water are added at 120° F. after the mass has been sufficiently heated and changed from a coarsely granular mass to a smooth stiff pasty one. The resulting solution will be at about 160° F. to 170° F., at which temperature the dilution under continuous stirring may be completed. This latter temperature at which the dilution is carried out is not important, but I prefer not to let the mass become too cold, since it is difficult to thin the viscous mass at low temperatures. Too high temperatures must be avoided, for example 200° F., for considerable lengths of time, since they may cause darkening of the product. The pH value of the resulting solution will be about 6.1, and if desired the solution may be partly neutralized or rendered slightly alkaline by the addition of suitable alkalis, such as borax, ammonium carbonate, etc. It is to be noted that the solution and stabilization of the casein is brought about during the initial heating stage and not by subsequent dilution. This dilution is performed to vary the consistency of the solution for the aforementioned purposes.

Following the preparation of the solution as outlined above, it is allowed to cool to normal temperatures, or, if desired, it may be cooled more rapidly with any convenient and suitable cooling medium.

It is to be noted that a solution may be rendered alkaline before the addition of the thinning water, or, if desired, the alkali may be added simultaneously with the thinning water, or, if desired, after the solution has been fully thinned down to the desired consistency. The order of addition of alkali and water following the initial heating and stabilizing treatment is not important.

Although I am well aware that the casein in my compositions may not be truly dissolved, the term "solution" in the appended claims is employed to cover generally a casein composition which: (a) appears homogeneous to the naked eye; (b) can be diluted under stirring to a flowing viscous gluelike liquid of adhesive characteristics; (c) does not coagulate to a curdy mass which may rise or settle, leaving some clear or translucent liquid; (d) appears smooth to the naked eye when smeared on glass with a spatula; and (e) when a solution, relatively rich in casein, has the characteristics of a stiff gel which will flow slowly.

Possessing the characteristic of stability over long periods of time, my solutions can be shipped or kept until, in the usual course of business, they are utilized. Although the initial viscosity of a solution is ordinarily determined within a few days after its preparation, subsequent measurements made up until the time of their use have indicated the viscosity of my solutions to be substantially uniform or substantially undiminished.

This invention is not to be restricted to the temperatures, percentages, or other exemplary data given, except as governed by the appended claims.

I claim:

1. A casein solution characterized by its stability and uniform viscosity over long periods of time, having a pH value from 8.0 to 9.0.

2. A casein solution comprising the heat-reaction product of casein, sodium fluoride and water, characterized by its stability and substantially undiminished viscosity over long periods of time and having a pH value of 7.0 to 10.5.

3. The process of producing a casein solution characterized by its stability and substantially undiminished viscosity over long periods of time and having pH values within the limits of 5.7 and 10.5, comprising heating casein in the presence of water and sufficient alkali to neutralize any excessive acidity but insufficient of itself to dissolve the casein, and an alkali metal fluoride at temperatures ranging from 170–210° F.

4. The process of producing a casein solution characterized by its stability and substantially undiminished viscosity over long periods of time and having pH values within the limits of 5.7 and 10.5, consisting of heating casein in the presence of water and an alkali fluoride at temperatures ranging from 170–210° F.

5. The process of producing a casein solution characterized by its stability and substantially undiminished viscosity over long periods of time and having pH values within the limits of 5.7 and 10.5, comprising heating casein in the presence of water and an alkali fluoride at temperatures ranging from 180–195° F.

6. The process of producing a casein solution characterized by its stability and substantially undiminished viscosity over long periods of time and having pH values within the limits of 5.7 and 10.5, comprising heating casein in the presence of water and sodium fluoride at temperatures ranging from 170–210° F. and subsequently diluting the reaction product with water.

7. The process of producing a casein solution characterized by its stability and substantially undiminished viscosity over long periods of time and having pH values within the limits of 5.7 and 10.5, comprising heating 100 parts of acid-precipitated casein, about 125–350 parts of water and about 14–20 parts of sodium fluoride at temperatures ranging from 170–210° F., and subsequently diluting the reaction product with water.

8. The process of producing a casein solution characterized by its stability and substantially undiminished viscosity over long periods of time and having pH values within the limits of 5.7 and 10.5, comprising heating 100 parts of acid-precipitated casein, about 125–350 parts of water and about 14–20 parts of an alkali fluoride at temperatures ranging from 180–195° F.

9. A casein solution characterized by its stability and substantially undiminished viscosity over long periods of time having a pH value in the range of 7.0 to 10.5.

10. A casein solution characterized by its stability and substantially undiminished viscosity over long periods of time which remains stable for pH values in the range of 5.7 to 10.5.

11. The process of producing a casein solution characterized by its stability and substantially undiminished viscosity over long periods of time and having pH values within the limits of 5.7 and 10.5 comprising heating casein in the presence of water and a casein solvent at temperatures ranging from 170–210° F., for a time sufficient to substantially completely dissolve the casein and until the resulting solution having a pH value within said limits has become stable.

12. The process of producing a casein solution characterized by its stability and substantially undiminished viscosity over long periods of time and having pH values within the limits of 5.7 and 10.5, comprising heating casein in the presence of water and a casein solvent at temperatures ranging from 180–195° F. for a time sufficient to substantially completely dissolve the casein and until the resulting solution having a pH value within said limits has become stable.

13. The process of producing a casein solution characterized by its stability and substantially uniform viscosity over long periods of time and having pH values within the limits of 5.7 and 9.0, comprising heating casein in the presence of water, and an alkali fluoride at temperatures ranging from 170–210° F.

14. The process of producing a casein solution characterized by its stability and substantially undiminished viscosity over long periods of time and having pH values within the limits of 7.0 and 10.5, comprising heating casein in the presence of water and a casein solvent at temperatures ranging from 170–210° F. for a time sufficient to substantially completely dissolve the casein and until the resulting solution has become stable, and subsequently rendering the resulting product alkaline in reaction.

15. The process of producing a casein solution characterized by its stability and substantially undiminished viscosity over long periods of time and having pH values within the limits of 7.0 and 10.5 comprising heating casein in the presence of water and an alkali fluoride at temperatures ranging from 170–210° F., and subsequently diluting the reaction product with water and rendering the same alkaline in reaction.

16. The process of producing a casein solution characterized by its stability and substantially undiminished viscosity over long periods of time and having pH values within the limits of 5.7 and 10.5, comprising partly neutralizing excessive acid compounds present in the casein, and heating the thus treated casein in the presence of water and an alkali metal fluoride, at temperatures ranging from 170–210° F.

17. The process of producing a casein solution characterized by its stability and uniform viscosity over long periods of time and having pH values within the limits of 8.0 and 9.0 comprising heating casein in the presence of water and a casein solvent at temperatures ranging from 170–210° F., for a time sufficient to substantially completely dissolve the casein and until the resulting solution has become stable and rendering the product alkaline.

18. The process of producing a casein solution characterized by its stability and substantially undiminished viscosity over long periods of time and having pH values within the limits of 5.7 and 10.5 comprising heating casein in the presence of water and sodium fluoride at temperatures ranging from 180-195° F.

19. A casein solution comprising the heat (180-195° F.) reaction product of casein, a solvent therefor and water, characterized by its stability and substantially undiminished viscosity over long periods of time and having a pH value in the range of 7.0 to 10.5.

20. A casein solution comprising the heat (180-195° F.) reaction product of casein, a solvent therefor and water, characterized by its stability and substantially undiminshed viscosity over long periods of time which remains stable for pH values in the range of 5.7 to 10.5.

21. A casein solution characterized by its stability and substantially uniform viscosity over long periods of time, having a pH value from 7.0 to 9.0.

CARL IDDINGS.

CERTIFICATE OF CORRECTION.

Patent No. 2,154,400.                                April 11, 1939.

CARL IDDINGS.

It is hereby certified that error appears in the printed specification of the above numbered patent requiring correction as follows: Page 1, first column, line 13, for "displayes a" read displays no; same line, before "is" insert and; and that the said Letters Patent should be read with this correction therein that the same may conform to the record of the case in the Patent Office.

Signed and sealed this 16th day of May, A. D. 1939.

(Seal)

Henry Van Arsdale
Acting Commissioner of Patents.

completely dissolve the casein and until the resulting solution has become stable and rendering the product alkaline.

18. The process of producing a casein solution characterized by its stability and substantially undiminished viscosity over long periods of time and having pH values within the limits of 5.7 and 10.5 comprising heating casein in the presence of water and sodium fluoride at temperatures ranging from 180–195° F.

19. A casein solution comprising the heat (180–195° F.) reaction product of casein, a solvent therefor and water, characterized by its stability and substantially undiminished viscosity over long periods of time and having a pH value in the range of 7.0 to 10.5.

20. A casein solution comprising the heat (180–195° F.) reaction product of casein, a solvent therefor and water, characterized by its stability and substantially undiminshed viscosity over long periods of time which remains stable for pH values in the range of 5.7 to 10.5.

21. A casein solution characterized by its stability and substantially uniform viscosity over long periods of time, having a pH value from 7.0 to 9.0.

CARL IDDINGS.

CERTIFICATE OF CORRECTION.

Patent No. 2,154,400.      April 11, 1939.

CARL IDDINGS.

It is hereby certified that error appears in the printed specification of the above numbered patent requiring correction as follows: Page 1, first column, line 13, for "displayes a" read displays no; same line, before "is" insert and; and that the said Letters Patent should be read with this correction therein that the same may conform to the record of the case in the Patent Office.

Signed and sealed this 16th day of May, A. D. 1939.

(Seal)      Henry Van Arsdale
         Acting Commissioner of Patents.